United States Patent
Holmes et al.

(10) Patent No.: US 8,839,819 B2
(45) Date of Patent: Sep. 23, 2014

(54) DIRECT-ACTING PILOT PRESSURE CONTROL SOLENOID

(75) Inventors: Garrett R. Holmes, Ortonville, MI (US); Jeffrey J. Waterstredt, Royal Oak, MI (US); Daniel L. Deland, Davison, MI (US)

(73) Assignee: Borgwarner Inc., Auburn Hills, MI (US)

( * ) Notice: Subject to any disclaimer, the term of this patent is extended or adjusted under 35 U.S.C. 154(b) by 1039 days.

(21) Appl. No.: 12/440,773

(22) PCT Filed: Sep. 26, 2007

(86) PCT No.: PCT/US2007/020794
§ 371 (c)(1),
(2), (4) Date: Feb. 12, 2010

(87) PCT Pub. No.: WO2008/039500
PCT Pub. Date: Apr. 3, 2008

(65) Prior Publication Data
US 2010/0139795 A1    Jun. 10, 2010

Related U.S. Application Data

(60) Provisional application No. 60/847,222, filed on Sep. 26, 2006.

(51) Int. Cl.
*F16K 11/065* (2006.01)
*F16K 31/06* (2006.01)
*F16K 11/07* (2006.01)

(52) U.S. Cl.
CPC ......... *F16K 31/0613* (2013.01); *F16K 11/0716* (2013.01)

USPC ..................................... 137/625.68

(58) Field of Classification Search
USPC ..................................... 137/625.68
See application file for complete search history.

(56) References Cited

U.S. PATENT DOCUMENTS

| | | | | | |
|---|---|---|---|---|---|
| 4,160,492 | A | * | 7/1979 | Johnston | 182/2.2 |
| 4,184,512 | A | * | 1/1980 | Pignolet | 137/596 |
| 4,341,243 | A | * | 7/1982 | Melocik | 137/625.68 |
| 4,777,981 | A | * | 10/1988 | Petro | 137/636.2 |
| 5,778,932 | A | | 7/1998 | Alexander | 137/625.65 |
| 5,878,782 | A | * | 3/1999 | Nakajima | 137/625.65 |
| 6,179,268 | B1 | | 1/2001 | Seid | 251/65 |
| 6,811,135 | B2 | | 11/2004 | Moreno et al. | 251/129.02 |
| 2002/0162593 | A1 | * | 11/2002 | Arnold | 137/625.65 |
| 2011/0089352 | A1 | * | 4/2011 | Morgan et al. | 251/129.15 |

* cited by examiner

*Primary Examiner* — Craig Schneider
(74) *Attorney, Agent, or Firm* — Howard & Howard Attorneys PLLC

(57) ABSTRACT

A solenoid valve has a body with a fluid passage extending longitudinally at least partially through the body. Each of supply, control, and exhaust ports is disposed through the body and operably connected to the passage (the supply port also introducing fluid medium from a pressure source). Among the ports, there is a valve member operably disposed in the passage. A bore extends at least partially through the member. A metering orifice connects the passage or exhaust port with the bore. A solenoid portion has a coil with an armature movable within the portion in response to energization of the coil, and a shaft is connected to the armature. The shaft extends partially into the body and directly contacts the member, and the energization of the coil causes the shaft to slide within the solenoid portion and move the member in response to movement of the armature within the portion.

1 Claim, 5 Drawing Sheets

DIRECT-ACTING PILOT PRESSURE CONTROL SOLENOID

CROSS-REFERENCE TO RELATED APPLICATIONS

This application claims the benefit of U.S. Provisional Application No. 60/847,222, filed Sep. 26, 2006. The disclosure of the above application is incorporated herein by reference.

FIELD OF THE INVENTION

The present invention relates to a variable force solenoid for pilot pressure control in automatic transmissions.

BACKGROUND OF THE INVENTION

Solenoids are used in automobiles to control numerous devices such as clutch mechanisms or other transmission components. Additionally, it is possible for solenoids to be used in virtually any other hydraulically or pneumatically actuated vehicle system.

Referring now to FIG. 3 which shows a prior art valve 100, certain types of solenoids incorporate the use of a spool 102 that moves within a bore 104 of a valve portion of the valve 100. Typically, the valve 100 will have metering edges 103 on the spool 102 to allow fluid flow from a supply port 105 to a control port 107 and from the control port 107 to an exhaust port 109. When this type of valve 100 is actuated a downward force 108 is applied and the spool 102 moves downward in the bore 104. Fluid flows 110 from supply port 105 to control port 107, the fluid accelerates 112 between the supply port 105 and control port 107 creating a transient flow force which acts on the spool 102. This transient flow force acts to further open the spool 102 to the supply port 105 which in turn cause further acceleration of the fluid and increased downward transient flow forces 114 and so on. This has a very destabilizing effect on the valve 100 and is undesirable. Thus it is desirable to have a spool valve design in which any transient flow forces resulting from the valve opening to either supply or exhaust would act to close the valve and thus provide a stabilizing effect rather than a destabilizing one.

SUMMARY OF THE INVENTION

The present invention is directed to a solenoid valve having a valve body with a fluid passage extending at least partially through the valve body. A supply port is disposed through the valve body and is operably connected to the fluid passage. The supply port introduces fluid medium such as hydraulic fluid, transmission fluid or some other suitable fluid from a pressure source such as a pump. A control port is also disposed through the valve body and is operably connected to the fluid passage. Between the control port and the supply port there is a valve member that is operably disposed in the fluid passage and has a bore that .extends at least partially through the valve member to allow fluid to flow from the supply port to the control port. Two or more metering orifices connect the fluid passage with the bore of the valve member. The solenoid valve body also has a metering land operably engaged to the metering orifices. The valve member will slide with respect to the metering land in order to control the flow of fluid through the metering orifices to and from the bore. Further areas of applicability of the present invention will become apparent from the detailed description provided hereinafter. It should be understood that the detailed description and specific examples, while indicating the preferred embodiment of the invention, are intended for purposes of illustration only and are not intended to limit the scope of the invention.

BRIEF DESCRIPTION OF THE DRAWINGS

The present invention will become more fully understood from the detailed description and the accompanying drawings, wherein.

DETAILED DESCRIPTION OF THE PREFERRED EMBODIMENTS

The following description of the preferred embodiment(s) is merely exemplary in nature and is in no way intended to limit the invention, its application, or uses.

Figure 1A:
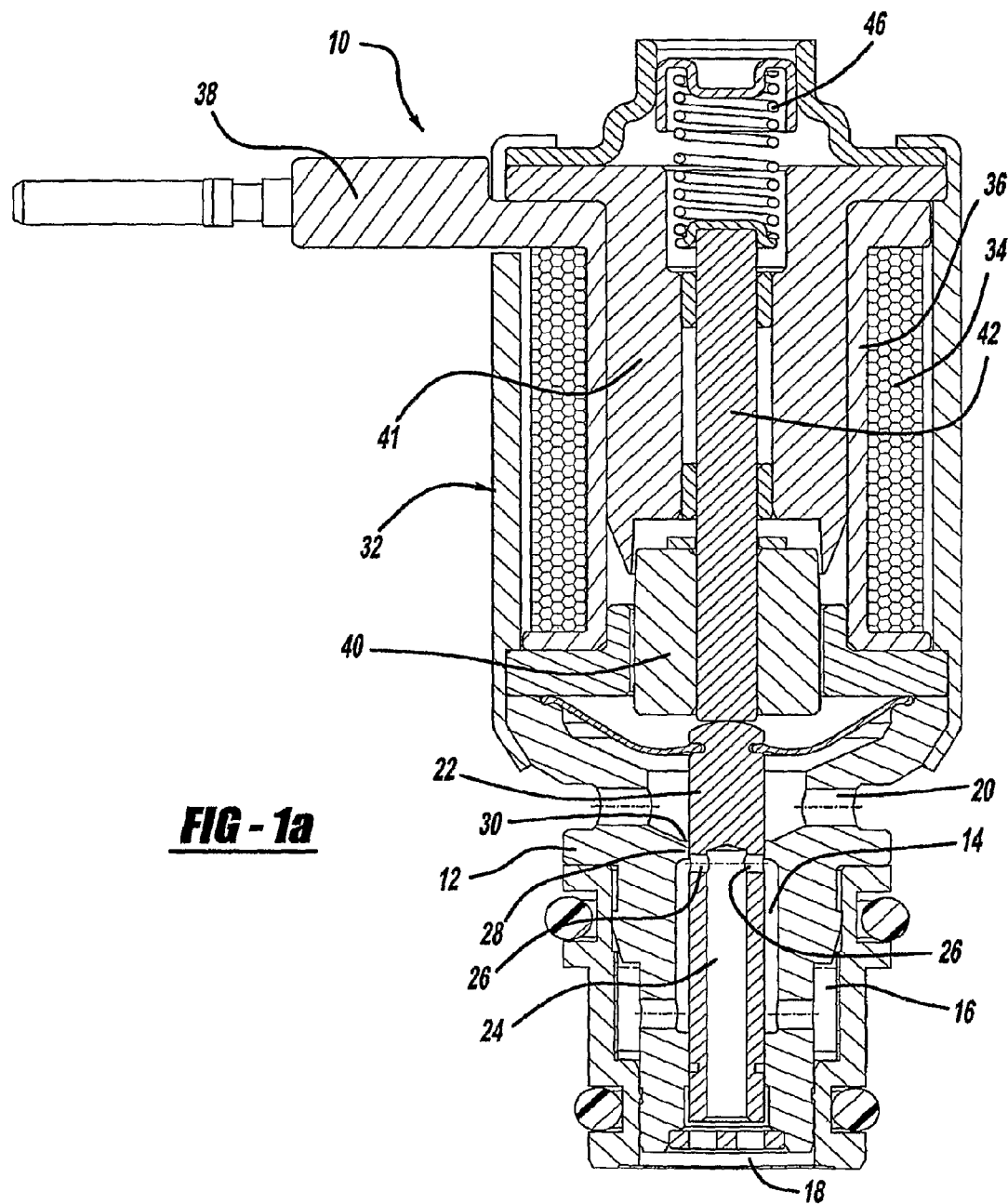
FIG. 1a is a cross-sectional diagram of the solenoid valve having a metering orifice in a first position.
Figure 1B:
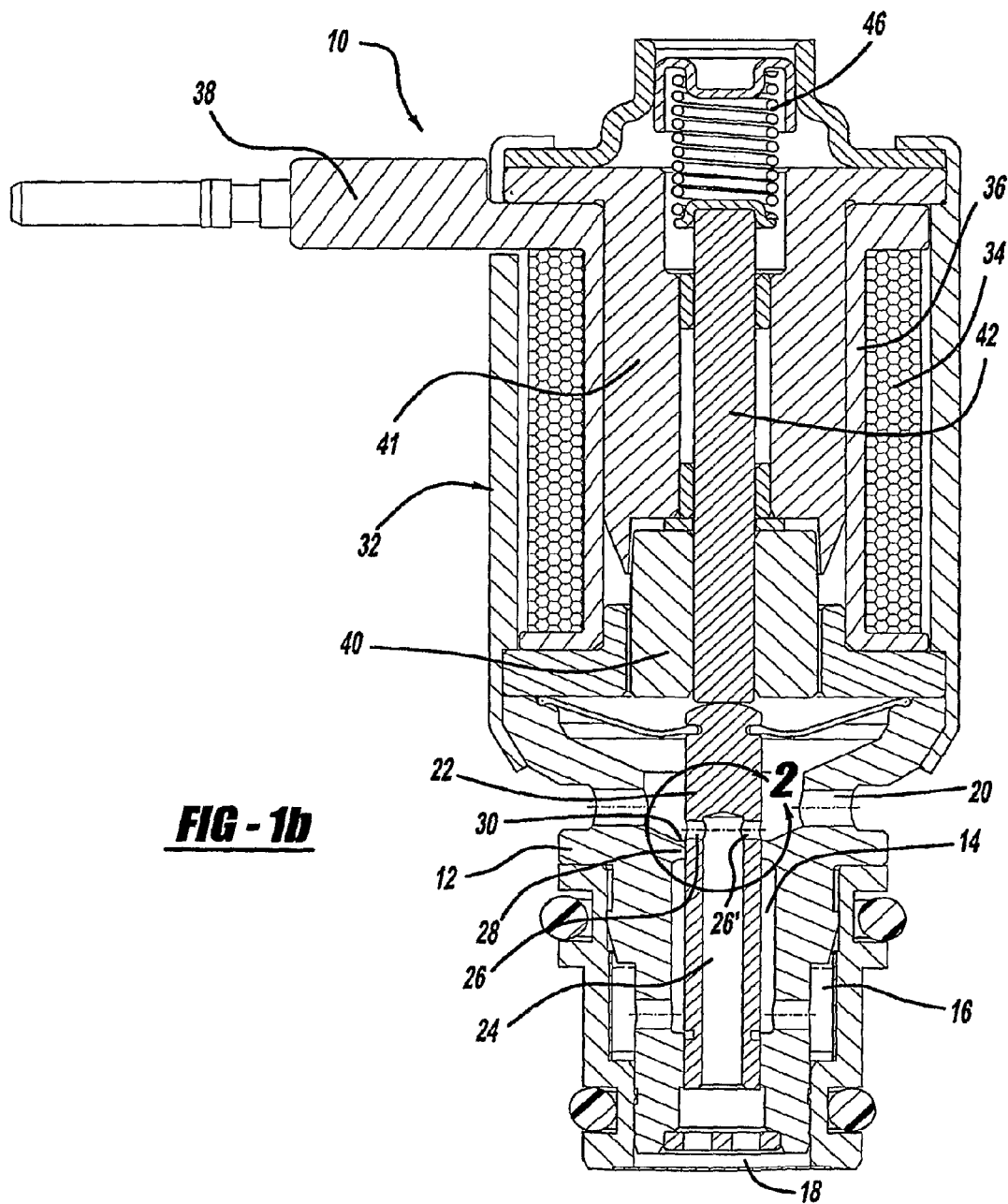
FIG. 1b is a cross-sectional diagram of the solenoid valve with the metering orifice in a second position.
Figure 2:
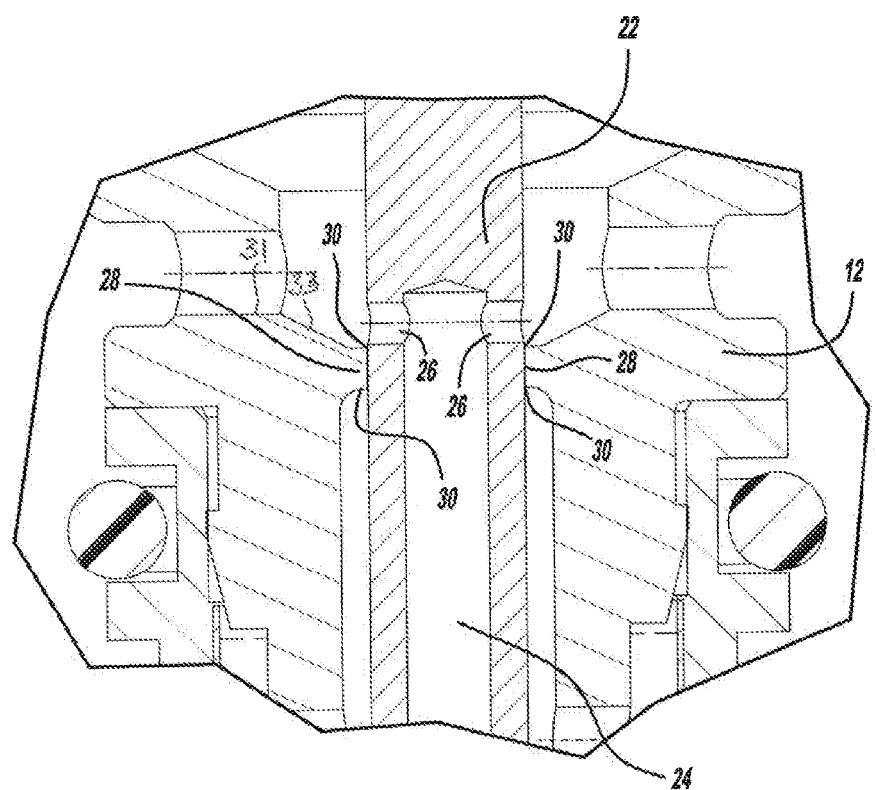
FIG. 2 is an exploded view of the metering orifice and metering land.

Referring to FIGS. 1a and 1b both the drawings show a cross-sectional view of the solenoid valve 10 in accordance with the present embodiment of the invention. The solenoid valve 10 has a valve body 12 having a fluid passage 14 longitudinally disposed through the valve body 12. Connected to the fluid passage 14 in the valve body 12 is a supply port 16 which introduces pressurized fluid from a supply source such as a pump (not shown) to the valve body 12.

There is also a control port 18 at the end of the valve body 12 which communicates a pressure regulated by the solenoid valve 10 to downstream components. The components can be any type of hydraulically actuated device including but not limited to spool valves and clutches.

The valve body 12 also includes an exhaust port 20 for venting pressure from the control port 18 when desired.

A valve member 22 is slidably disposed through the valve body 12 and includes a bore 24 to communicate pressure from the control port 18 and two or more metering orfices 26. The metering orfices engage a metering land 28 of the valve body 12.

The valve member 12 is able to modulate pressure at the control port 18 by opening and closing the metering orifices 26 to the fluid passage 14 or the exhaust port 20 across the metering land 28. Pressure in the control port 18 acts on the full area of the valve member 22 to provide a feedback force in an upward direction relative to the figures. To this end, the exhaust port 20 further includes a first portion 30 that extends parallel to the metering orifices 26 and, a second portion 31 spaced from the first portion 30 that extends parallel to the metering orifice 26 and an intermediate portion 33 that extends obliquely with respect to the first and second portions 30 and 31.

A solenoid portion 32 is connected to or integrated with the valve body 12. The solenoid portion 32 contains a coil 34 wound on a bobbin 36. The coil 34 can be energized through a connecter 38 connected to the solenoid portion 32. Within the solenoid portion 32 there is an armature 40 that moves within the solenoid portion 32 upon energization of the coil 34. The armature 40 is connected to a shaft 42 that is guided by a pole piece 41. The shaft 42 extends through the armature 40 and contacts the valve member 22 in the valve body 12.

Referring now to FIGS. 1a and 1b the operation of the solenoid valve 10 will be described. When the coil 34 and the solenoid portion 32 is deenergized, a spring 46 will cause the shaft 42 and the armature 40 to move the valve member 22 to a first position as shown in FIG. 1a. When the valve member 22 is in this position pressure from the supply port 16 will meter across the metering orifices 26 and into the bore 24. The pressure in the bore 24 will be supplied to the control port 18. Pressure at the control port 18 will rise until the feedback force resulting from said pressure applied to the entire diameter of the valve member 12 matches the force of the spring 46. When the feedback force and spring force are equal, the valve member 12 will move to a neutral position relative to the metering land 28. This configuration is what is known as a normally high configuration. This means that when the solenoid valve 10 is in a de-energized state high pressure will be provided to the control port 18. It is within the scope of this invention to have the solenoid valve 10 be configured to have a normally low configuration where the valve member 22 will move to a position where pressure from the supply port 16 will not be supplied to the control port 18 when the valve is de-energized.

When the solenoid valve 10 is energized the armature 40 will move in a second direction to the position shown in FIG. 1b where the metering orifices 26 are exposed on the other side of their respective metering lands 30 to the exhaust port 20. When the orifices 26 are at this position, pressure in the bore 24 will be relieved through the metering orifices 26 and vented through the exhaust port 20. The pressure at the control port 18 will be reduced until the feedback force is equal to the spring force minus the magnetic force created by energizing the solenoid portion 32.

The magnetic force generated by the solenoid portion 32 is proportional function of the current applied to the coil 34. The pole piece 41 and the armature 40 are designed so that the magnetic force will be relatively independent of the armature's 40 relative position to the pole piece 41.

Therefore if current to the coil 34 is incrementally increased, the magnetic force of the solenoid portion 32 will be increased and the pressure in the control port will be reduced by an amount proportional to the force increase to maintain the force balance of the spring load, magnet force and feedback force.

If the current to the coil 34 is incrementally reduced, the magnet force of the solenoid portion 32 will be likewise reduced and the pressure in the control port will be increased by an amount proportional to the force decrease to maintain the same force balance.

The preceding paragraphs describe the static behavior of the solenoid valve 10 while modulating pressure at the control port 18 as a function of current applied to the coil 34. There are additionally transient conditions that exist when there is a step change in current either increasing or decreasing. When step changes to current occur a transient disruption to the force balance likewise occurs and the valve member 22 will move in one direction or the other under the unbalanced force. If there is a step increase in current and the valve member 22 subsequently moves to open the metering orifices 26 to the exhaust port 20 the fluid in the bore 24 of the valve member 22 will then accelerate from a static condition to flow from the control port 18 through the control orifices 26 and out to the exhaust port 20. This fluid acceleration will create a reaction force on the valve that acts to close the opening. This is a stabilizing force that helps maintain precise control of pressure while exhausting pressure from the control port 18.

If on the other hand there is a step decrease in current and the valve member 22 subsequently moves to open the metering orifices 26 to the fluid passage 14 the fluid in the bore 24 of the valve member 22 will then accelerate from a static condition to flow to the control port 18 through the control orifices 26 from the fluid passage 14 and the upstream supply port 16. This fluid acceleration will also create a reaction force on the valve that acts to close the opening. This is also a stabilizing force that helps maintain precise control of pressure will pressurizing the control port 18.

Figure 3:
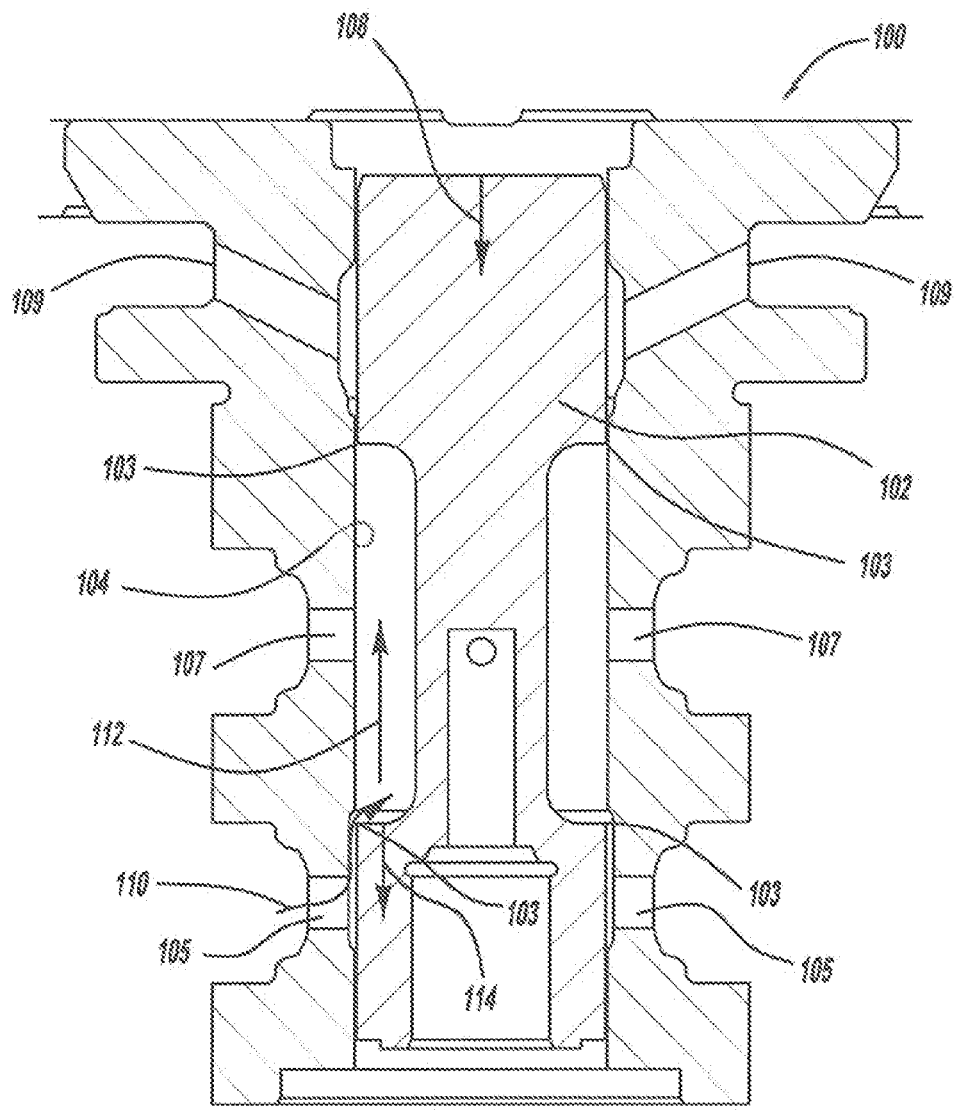
FIG. 3 is a prior art example of a spool valve with annotation showing the destabilizing transient flow forces.
Figure 4:
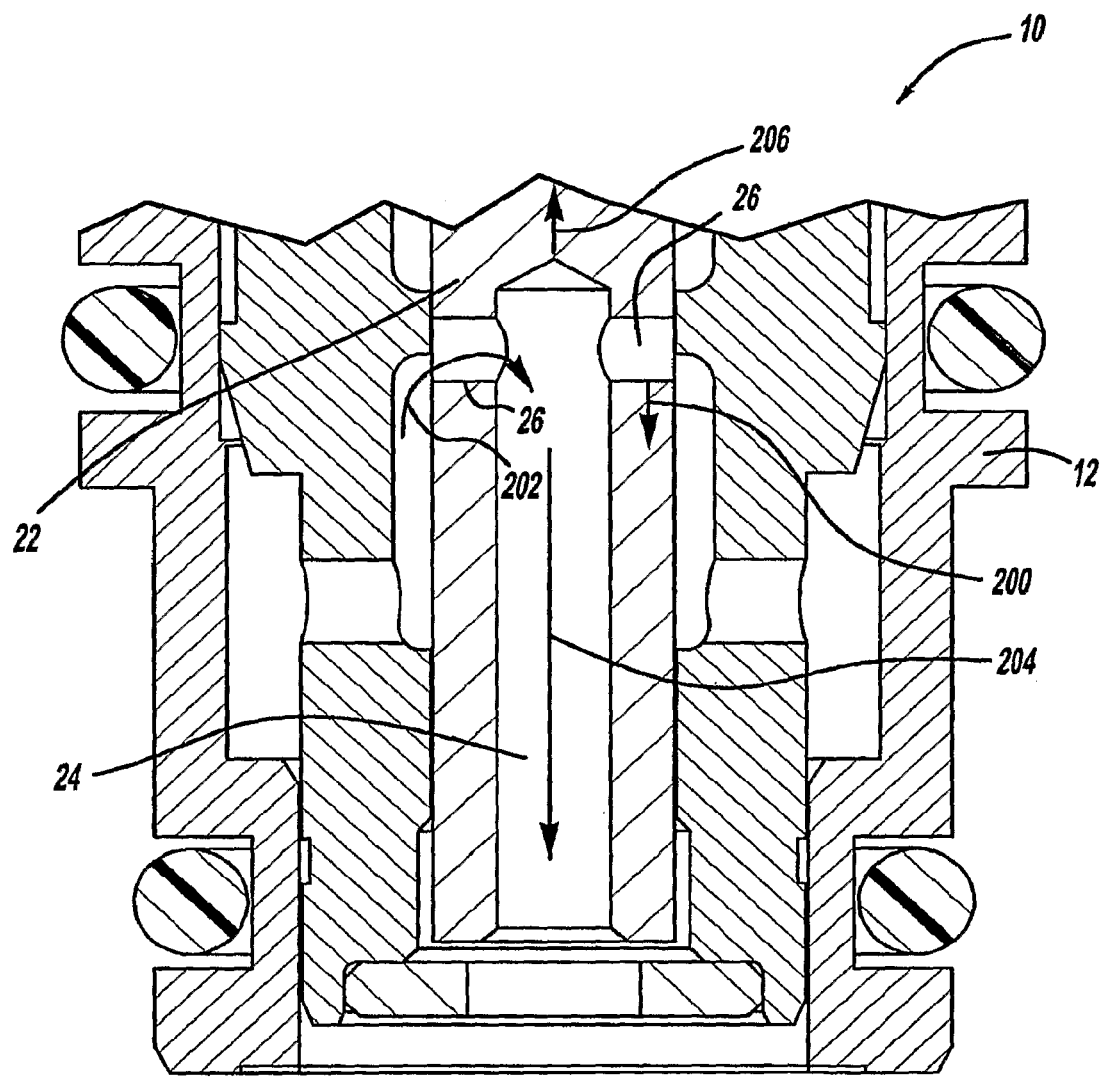
FIG. 4 is an exploded view of the valve member and valve body with annotation showing the stabilizing transient flow forces.

This unique design concept provides the solenoid valve 10 the characteristic of having a stabilizing transient flow force while flowing either to or from the control port 18 in a compact package. The advantages of this design are better illustrated in FIG. 4. As the solenoid applies a downward force 200 to the valve member 22, fluid 22 passes through the orifices 26 and into the bore 24. As fluid pressure builds in the bore 24 an upward reaction force 206 or reaction force is applied to the valve member 22 at the center of the valve member 22. The upward reaction force 206 provides an advantage over prior art spool valve designs, shown in FIG. 3, which have downward reaction forces 114 that do not stabilize the transient flow.

The description of the invention is merely exemplary in nature and, thus, variations that do not depart from the gist of the invention are intended to be within the scope of the invention. Such variations are not to be regarded as a departure from the spirit and scope of the invention.

What is claimed is:
1. A valve comprising:
a valve body having a fluid passage extending longitudinally at least partially through said valve body;
a supply port disposed through said valve body and operably connected to said fluid passage;
a control port disposed through said valve body and operably connected to said fluid passage;
a valve member operably disposed in said fluid passage for controlling the flow of fluid medium between said supply port and said control port, wherein said valve member has a bore extending at least partially through said valve member for providing the flow between said supply port and said control port;
an exhaust port disposed through said valve body and operably connected to said fluid passage, a plurality of metering orifices extending through said valve member between said bore and fluid passage, said exhaust port further including a first portion that extends parallel to said metering orifices, a second portion spaced from said first portion that extends parallel to said metering orifices and an intermediate portion that extends obliquely with respect to said first and said second portions,
a metering land operably disposed in a sliding relationship with respect to said valve member and said metering orifices, wherein said valve member controls the flow of fluid between said control port and either of said supply port and said exhaust port by moving with respect to said metering land; and
a solenoid portion having a coil with an armature movable within said solenoid portion in response to energization of said coil and a shaft connected to said armature, wherein said shaft extends partially into said valve body and directly contacts said valve member and said energization of said coil causes said shaft to slide within said solenoid portion and move said valve member in response to movement of said armature within said solenoid portion.

\* \* \* \* \*